(12) United States Patent
Anderson

(10) Patent No.: US 8,635,808 B1
(45) Date of Patent: Jan. 28, 2014

(54) PARTITIONED PLANTER

(76) Inventor: Shawn M. Anderson, Rochester, WA (US)

( * ) Notice: Subject to any disclaimer, the term of this patent is extended or adjusted under 35 U.S.C. 154(b) by 142 days.

(21) Appl. No.: 13/162,606

(22) Filed: Jun. 17, 2011

(51) Int. Cl.
*A01G 9/02* (2006.01)

(52) U.S. Cl.
USPC ............................................. 47/66.1; 47/85

(58) Field of Classification Search
USPC .......... 47/65.5, 66.1, 66.3, 66.4, 66.6, 73, 75, 47/76, 77, 83, 85, 86; 220/4.28, 4.29, 220/23.4, 23.86–23.89, 506; 206/423
See application file for complete search history.

(56) References Cited

U.S. PATENT DOCUMENTS

| | | | |
|---|---|---|---|
| 879,769 A | 2/1908 | Hight | |
| 2,014,175 A | 9/1935 | Hart | |
| 3,067,903 A | 12/1962 | Jones, Jr. | |
| 4,065,877 A | 1/1978 | Kelley | |
| 4,255,898 A | 3/1981 | Greenbaum | |
| 4,595,246 A | 6/1986 | Bross | |
| 5,215,205 A | 6/1993 | Behlman | |
| 5,412,907 A | 5/1995 | Anderson | |
| 5,979,112 A * | 11/1999 | Anderson | ...................... 47/66.5 |
| 2006/0230675 A1 | 10/2006 | Klohr et al. | |

\* cited by examiner

*Primary Examiner* — David Parsley
*Assistant Examiner* — Timothy Schwarz
(74) *Attorney, Agent, or Firm* — Montgomery Patent & Design; Robert C. Montgomery

(57) ABSTRACT

A partitioned planter for expandable compartmentalized plant growth includes an outer container and removable progressively smaller inner compartments. The planter provides water drainage and molded features to retain and position the inner compartments. The removable compartments each have a plurality of flat wall sections which are assembled to form a structure which contains the plant roots during growth. The wall segments also include stiffening brackets which engage top perimeter edges of forwardly adjacent wall members for additional structural stabilization.

14 Claims, 5 Drawing Sheets

PARTITIONED PLANTER

RELATED APPLICATIONS

The present invention was first described in a notarized Official Record of Invention on Jul. 28, 2010, that is on file at the offices of Montgomery Patent and Design, LLC, the entire disclosures of which are incorporated herein by reference.

FIELD OF THE INVENTION

The present invention relates generally to gardening devices, and in particular, to a partitioned modular planter which provides for progressive expansion of the growing container in response to the growth of a plant.

BACKGROUND OF THE INVENTION

Plants, flowers, shrubs and trees are a welcome addition to almost any indoor or outdoor landscaping project. Their vibrant colors combined with their unique live appearance often form the centerpiece of most architectural landscaping. Most of these plants begin their life from a seed that grows in a small pot, then transplanted to a larger pot, and perhaps even undergo one (1) or two (2) more transplants throughout their life cycle. This transplant process requires the user to lift the planting out of the pot which can subject it to damage or shock. It can also cause damage to the roots themselves causing plant death. This transplanting process equates to loss in plants, time, and expense. Furthermore, this process typically wastes potting soil and requires multiple pots and containers per plant.

While various pots and planters are available to care for the growth of a plant throughout its life cycle, none of the current devices or methods address these problems and each suffers from one or more defect or deficiency.

SUMMARY OF THE INVENTION

The inventor has therefore recognized the aforementioned inherent problems and lack in the art and observed that there is a need for means by which various plants can be re-planted or re-potted without the disadvantages as described above. In accordance with the invention, it is an object of the present embodiments to solve one or more of these problems.

The inventor recognized these problems and has addressed this need by developing a partitioned planter that provides for transplanting of various types of plants in a manner which is quick, easy, and effective, which also improves plant life and does not disturb the root system. The inventor has thus realized the advantages and benefits of providing the partitioned planter including an outer container having a floor and four wall members which define an outer cavity. A middle wall assembly is removably attachable to the container floor and is located interior to the container wall members, thus defining a middle cavity. An inner wall assembly is also removably attachable to the container floor and is interior to the middle wall assembly, thus defining an inner cavity. When assembled, the inner cavity, the middle cavity, and the outer cavity in combination provide separate planting volumes of progressively larger size to accommodate the plant throughout its growth cycle as the root system becomes larger and requires more space.

The container floor further includes a plurality of wall retaining features. Each wall retaining feature is formed by a pair of semi-circular protrusions defining a gap to removably retain lower edges of the middle assembly and the inner wall assembly therebetween.

The middle wall assembly includes four (4) generally "L"-shaped middle wall segments. Each middle wall segment has a middle wall panel and a middle wall overlap feature which extends perpendicularly from a longitudinal side edge of the middle wall panel. When assembled, the middle wall overlap feature of each middle wall segment covers over a longitudinal side edge portion of a perpendicularly positioned adjacent middle wall segment to form a generally rectangular structure smaller in size that the outer container and defining the middle cavity.

The inner all assembly includes four (4) generally "L"-shaped inner wall segments. Each inner wall segment has an inner wall panel and an inner wall overlap feature extending perpendicularly from a longitudinal side edge of the inner wall panel. When assembled, the inner wall overlap feature of each inner wall segment covers over a longitudinal side edge portion of a perpendicularly positioned adjacent inner wall segment to form a generally rectangular structure smaller in size than the middle wall assembly and defining the inner cavity.

A method of providing growth care for the potted plant throughout its growth cycle is achieved by providing the outer container having the floor and four (4) wall members defining the outer cavity. The middle wall assembly is removably attached to the container floor interior to the container wall members to form the middle cavity. The inner wall assembly is removably attached to the container floor interior to the middle wall assembly to form the inner cavity. The inner cavity, middle cavity, and outer cavity are each filled with a potting soil mixture and the plant is positioned and planted within inner cavity. The inner wall assembly is removed from the outer container as the root system of the plant grows larger, thus growing the plant from within the middle cavity. The middle wall assembly is removed from said outer container as the root system of the plant grows larger, thus growing the plant from within the outer cavity.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
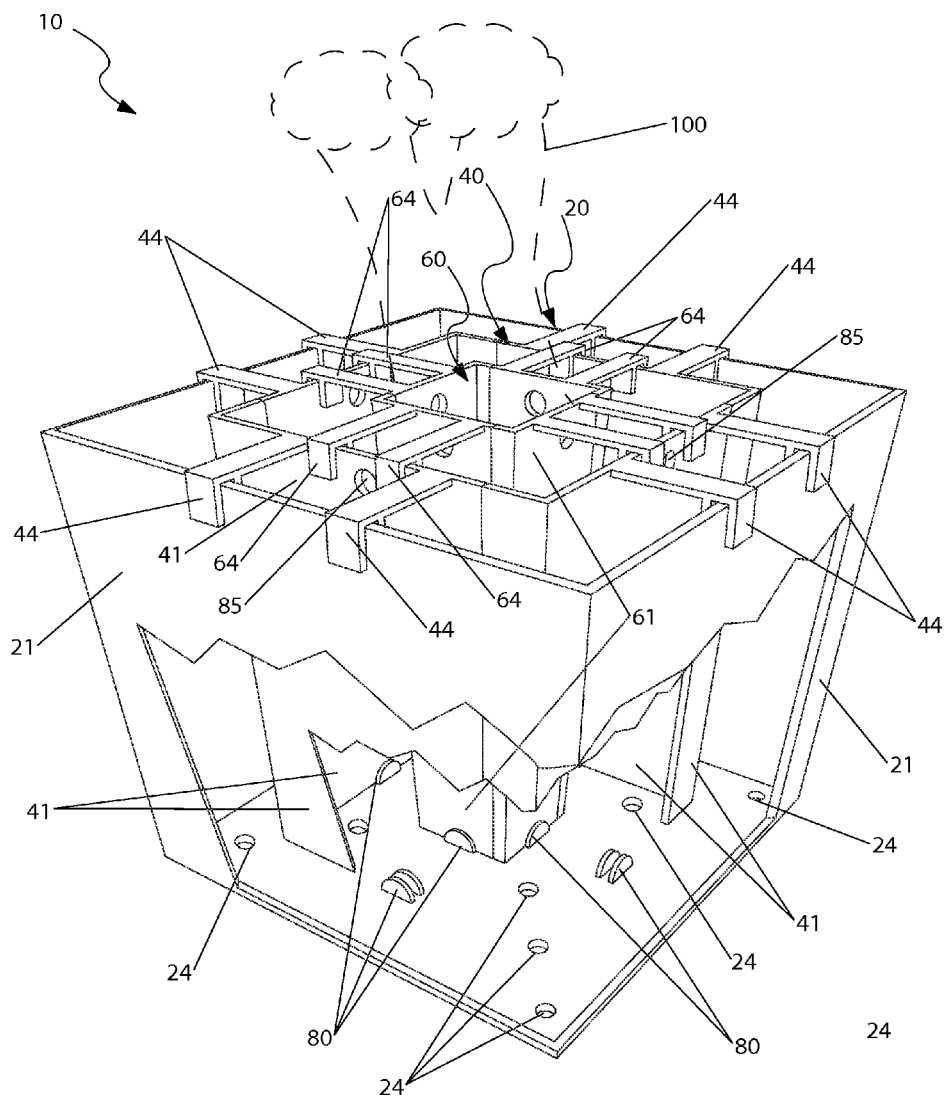
FIG. 1 is a partially cut-away perspective view of a partitioned planter, according to a preferred embodiment in accordance with the invention.

DESCRIPTIVE KEY 10 partitioned planter
20 outer container
21 outer wall member
22 outer container floor
24 drain aperture
40 middle wall assembly
41 middle wall segment
42 middle wall panel
43 middle wall overlap feature
44 first stiffener
46 first finger feature
60 inner wall assembly
61 inner wall segment
62 inner wall panel
63 inner wall overlap feature
64 second stiffener
66 second finger feature
80 wall retaining feature
85 first aperture
86 second aperture
100 plant

DETAILED DESCRIPTION OF THE PREFERRED EMBODIMENT

In accordance with the invention, the best mode is presented in terms of a preferred embodiment, herein depicted within FIGS. 1 through 6. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 6, depicting a partitioned planter (herein described as an "apparatus") 10, where like reference numerals represent similar or like parts. In accordance with the invention, the embodiments depicted in the present disclosure describe a planter with multiple removably attached interior walls which allow for volumetric expansion during various stages of a plant's growth without needing to transplant the plant.

Figure 2:
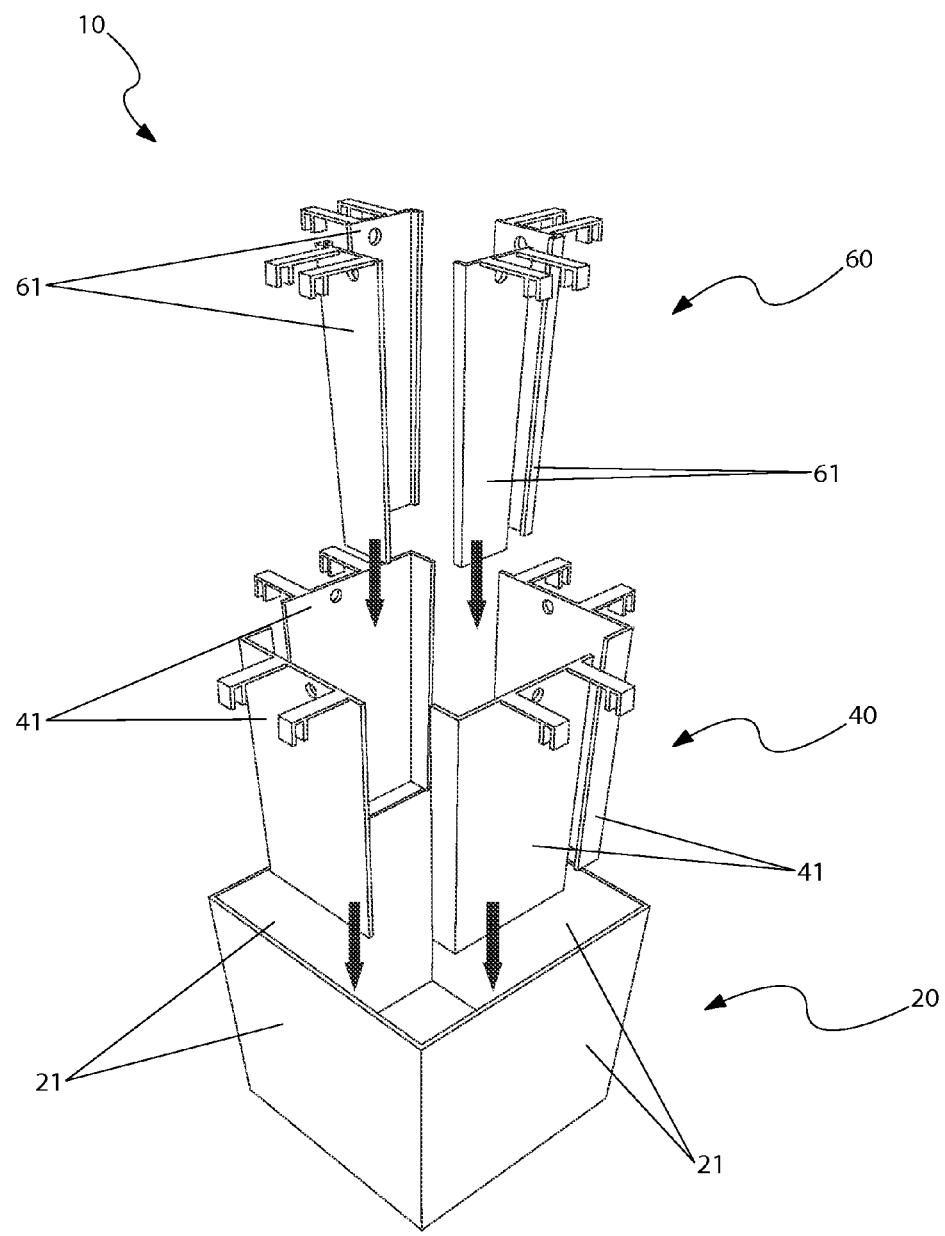
FIG. 2 is an exploded view of the partitioned planter, according to the preferred embodiment.

FIGS. 1 and 2 show a partially cut-away perspective view and exploded view of the apparatus 10, respectively. The apparatus 10 generally includes a decorative rectangularly-shaped open-topped outer container 20 having four (4) trapezoidal outer wall members 21 which taper slightly downward to a flat outer container floor 22. The apparatus 10 also includes a four (4) sided middle wall assembly 40 and a four (4) sided inner wall assembly 60. Both assemblies 40, 60 are arranged in a progressively concentric pattern within the outer container 20. The outer container 20, the middle wall assembly 40, and the inner wall assembly 60 combine to form three (3) circumscribed interconnected enclosures to form a rigid three (3) cavity structure.

In use, the apparatus 10 an amount of soil and a plant 100 are placed within the inner wall assembly 60 which is removed as the plant 100 grows larger, thereby expanding a volumetric space for the plant 100 as a root system grows outwardly to fill the larger middle wall assembly 40. As the plant continues to grow larger, the middle wall assembly 40 is removed to allow the root system and plant 100 to occupy the entire outer container 20, thereby avoiding conventional transplanting of the plant 100 as it grows.

The preferred size of the apparatus 10 is envisioned to be approximately twelve (12) inches square and approximately fourteen (14) inches tall; however, it can be appreciated by one skilled in the art that actual dimensions of the apparatus 10 can vary based upon a user's preference or a specific application, and as such, should not be interpreted as a limiting factor of the apparatus 10.

The outer container floor 22 includes a plurality of equally-spaced drain apertures 24 generally arranged in an "X"-shaped pattern to drain excess water and a plurality of wall retaining features 80 to position and retain bottom edges of the wall assemblies 40, 60 until removed.

The middle wall assembly 40 includes four (4) generally "L"-shaped middle wall segments 41, each having an edge portion that overlaps an edge of an adjacent middle wall segment 41. The middle wall segments 41 are assembled to each other to form a vertically tapering square enclosure smaller in size than the outer enclosure 20. Each middle wall segment 41 also includes a pair of integrally-molded and parallel first stiffeners 44 disposed along a top edge. Each first stiffener 44 extends horizontally outward to mechanically engage a top edge of the adjacent outer container wall member 21. The middle wall assembly 40 is inserted within the outer container 20 and attached to the top edge of each outer wall member 21 by engagement of the first stiffeners 44 and to the outer container floor 22 by engagement of the outer wall retaining features 80. The placement of the middle wall assembly 40 forms a gap between the middle wall segments 41 and the outer container wall members 21.

In similar fashion, the inner wall assembly 60 includes four (4) "L"-shaped and overlapping inner wall segments 61 which are assembled to form a vertically tapering square enclosure which is smaller than the middle wall assembly 40. Each inner wall segment 61 is insertable into an inner wall retaining feature 80 and also includes a pair of second stiffeners 64 which engagement a top edge of the adjacent middle wall segment 41. The placement of the inner wall assembly 60 forms a gap between the inner wall segments 61 and the middle wall segments 41. Each middle wall segment 41 and inner wall segment 61 is retained in position along respective bottom edges by the plurality of inner and outer wall retaining features 80 which are affixed to the outer container floor 22.

The gaps formed between the outer container 20, the middle wall assembly 40, and the inner wall assembly 60 provide for an expandable space for a plant 100 to grow through sequential removal of the inner wall assembly 60 and then the middle wall assembly 40 during the life cycle of the plant 100. The soil and other potting materials are initially placed within an internal volume of the apparatus 10 in an expected manner. Progressive removal of wall segments 41, 61 allow for expanding plant growing capacity. Each wall segment 41, 61 also includes a first finger aperture 85 and a second finger aperture 86, respectively. The finger apertures 85, 86 are approximately one (1) inch in diameter and are located adjacent to an upper edge of the wall segment 41, 61 to receive a finger of the user to assist in removal of the wall segments 41, 61 from the outer container 20.

As the plant 100 grows and needs a larger pot, the user pulls out the respective wall segments 41, 61 as needed using the first and second finger apertures 85, 86 until only the outer container 20 remains utilized as the plant container. This method of growing plants avoiding the damage to a plant's root system common to conventional transplanting.

The outer container 20, the middle wall assembly 40, and the inner wall assembly 60 are preferably made of a durable plastic material and are produced using plastic molding or extruding processes. The outer container 20, the middle wall assembly 40, and the inner wall assembly 60 are also envisioned to be introduced in a variety of attractive colors and patterns based upon a user's preference or to match an existing décor.

Figure 3:
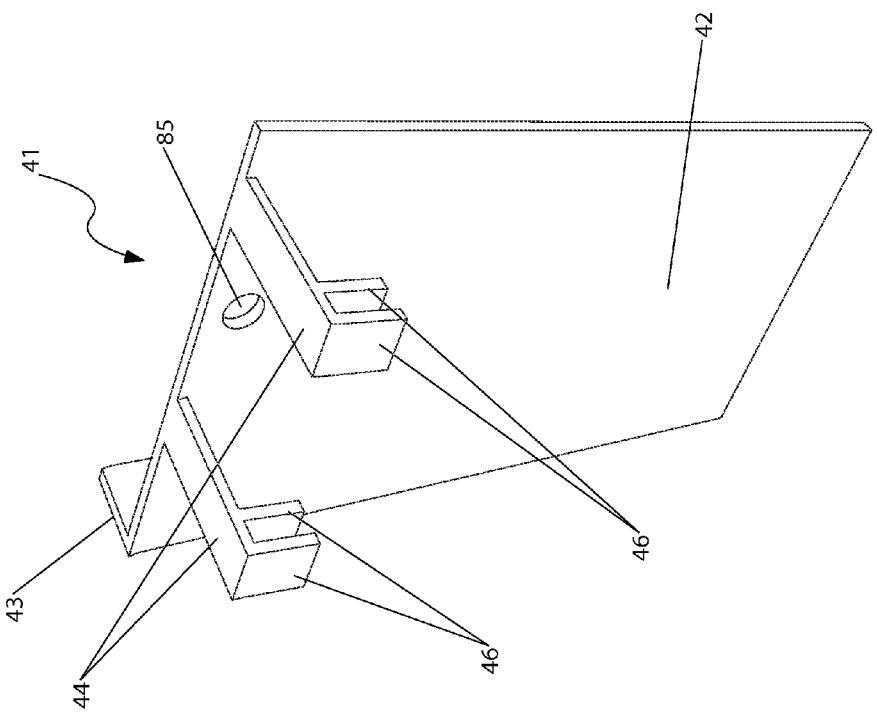
FIG. 3 is a perspective view of a middle wall segment of the partitioned planter, according to the preferred embodiment.

FIG. 3 shows a perspective view of the middle wall segment 41. Each middle wall segment 41 includes a middle wall panel 42, a middle wall overlap feature 43, the pair of first stiffeners 44, and the first aperture 85. The middle wall segment 41 is a unitary "L"-shaped structure formed by the long middle wall panel 42 and the shorter integral middle wall overlap feature 43 which extends at a right angle from a vertical edge of the middle wall panel 42. This "L"-shaped form allows the four (4) middle wall segments 41 to be arranged end-to-end to form a loosely sealed square container.

Figure 4:
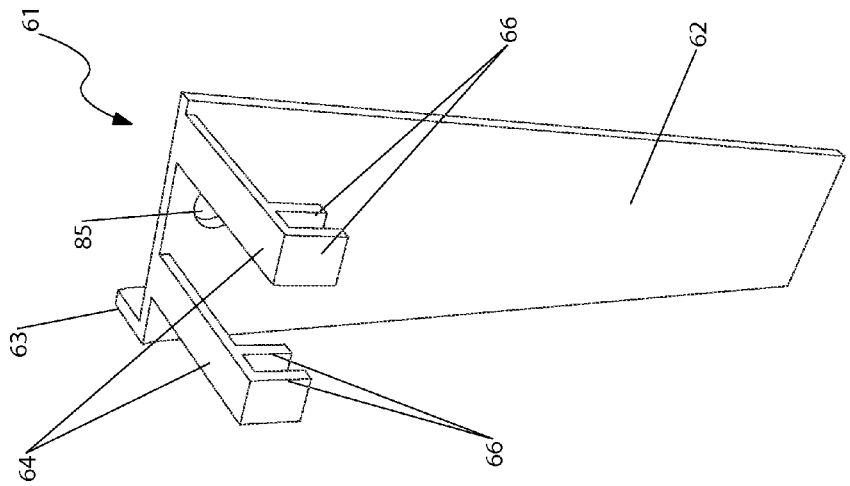
FIG. 4 is a perspective view of an inner wall segment of the partitioned planter, according to the preferred embodiment.

FIG. 4 shows a perspective view of the inner wall segment 61. The inner wall segments 61 form a similar structure and provide a similar function as the middle wall segments 41. However, the inner wall segments 61 include inner wall panels 62 and inner wall overlapping features 63 having smaller horizontal lengths. Each inner wall segment 61 also includes the pair of second stiffeners 64 each having a pair of second finger features 66, and the second aperture 86. The inner wall assembly 60 thereby fits within the middle wall assembly 40 defining the parallel gap therebetween.

Figure 5:
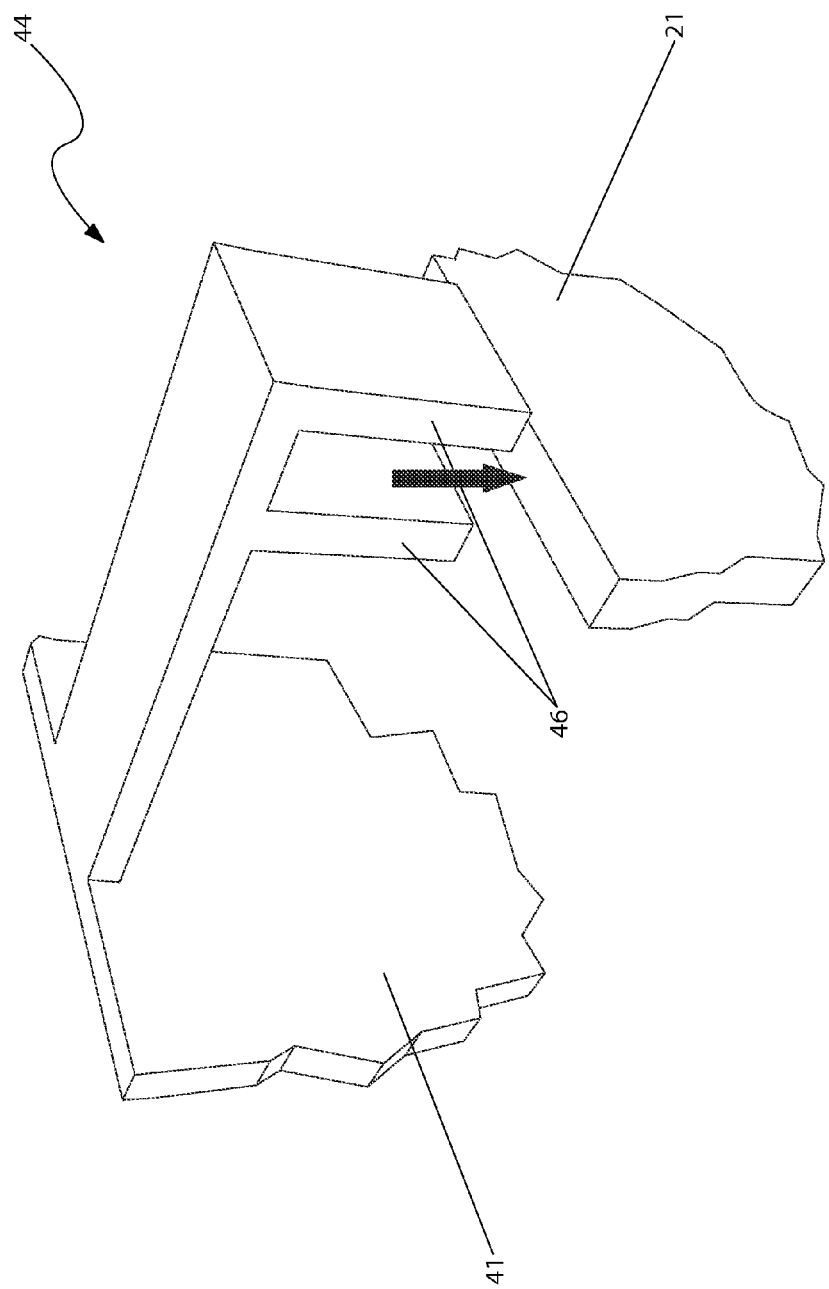
FIG. 5 is a close-up view of a stiffener feature of the partitioned planter, according to the preferred embodiment; and, FIG. 6 is a partially cut-away close-up view of the partitioned planter depicting wall retaining features of an outer container, according to the preferred embodiment

FIG. 5 shows a close-up view of a single first stiffener 44. Only a single first stiffener 44 is shown for clarity to demonstrate the engaging relationship between the middle wall segment 41 and the outer wall member 21. It can be appreciated that the second stiffeners 64 function in a substantially similar manner for the engaging relationship between the inner wall segments 61 and the middle wall segments 41. Each wall segment 41, 61 includes the pair of integral first stiffeners 44 and second stiffeners 64, respectively. The stiffeners 44, 64 are arranged in a horizontal and parallel manner and are preferably formed from thin flat protrusions approximately one-quarter (¼) inch in width and approximately two (2) inches in length. Each first stiffener 44 further also includes the pair of parallel and downwardly extending integral first finger features 46, as seen in FIG. 3. Each second stiffener 64 further also includes the pair of parallel and downwardly extending integral second finger features 66 as seen in FIG. 4. The finger features 46, 66 disposed on an outer end of the stiffener 44, 64 to receivingly engage the top edge of the respective outwardly adjacent outer wall member 21 and middle wall segment 41 and confine the same.

Figure 6:
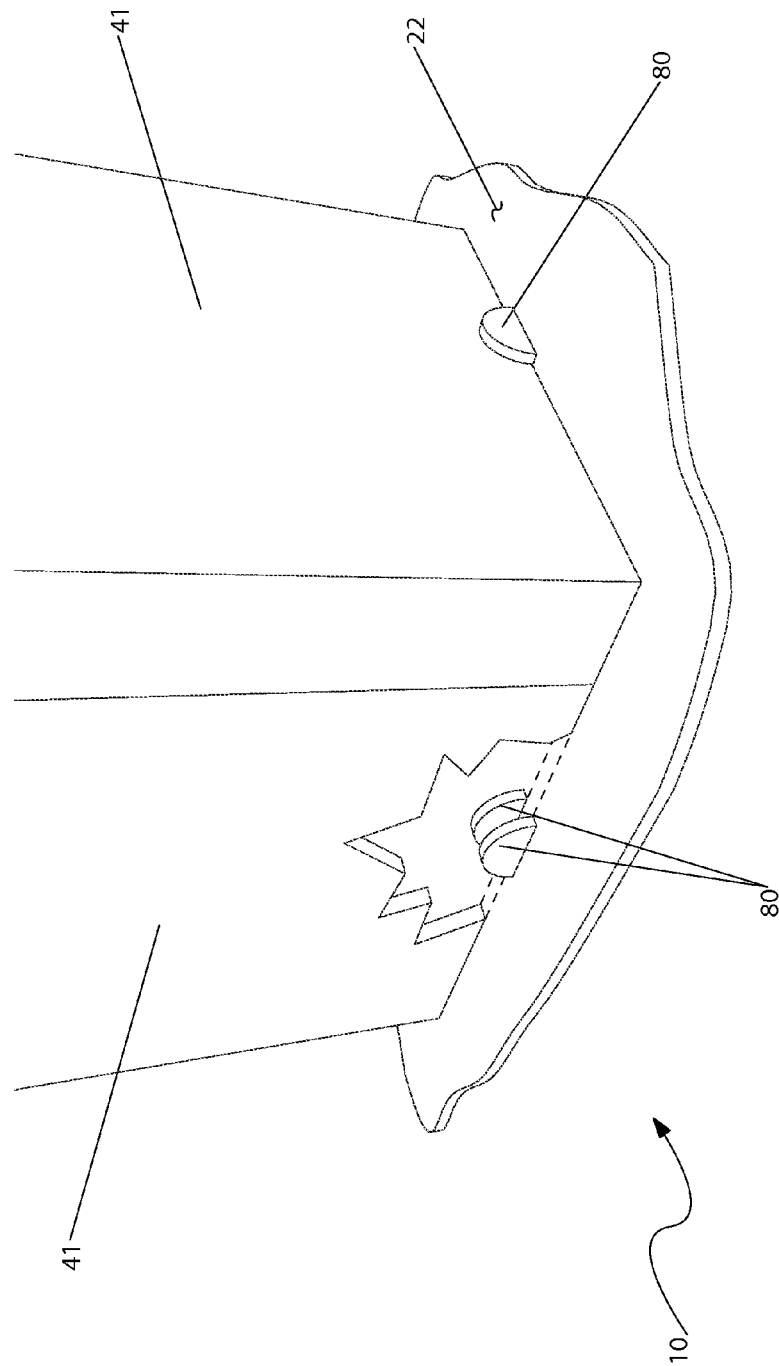

FIG. 6 shows a partially cut-away close-up view of the wall retainer features 80 of the outer container 20. Only the middle wall segments 41 are shown for clarity to demonstrate the engaging relationship between the middle wall segments 41 and the outer container floor 22. It can be appreciated that the inner wall segments 61 engage inner wall retaining features 80 in a substantially similar manner for the engaging relationship between the inner wall segments 61 and the outer container floor 22. The wall retaining features 80 laterally retain and position the bottom edges of the middle wall segments 41 and inner wall segments 61. The wall retaining features 80 are arranged in parallel pairs, each forming a semi-circular and upwardly protruding shape to define a gap therebetween for snug insertion of the bottom edge of each wall segment 41, 61. The plurality of wall retaining features 80 are preferably integrally molded into a top surface of the outer container floor 22 and contact inner and outer side surfaces of each wall segment 41, 61, respectively. The wall retaining features 80 provide secure lateral positioning of the wall segments 41, 61 while allowing quick vertical removal of the wall segments 41, 61, as needed.

In accordance with the invention, the preferred embodiment can be utilized by the user in a simple and effortless manner with little or no training. After initial purchase or acquisition of the apparatus 10, it is installed and utilized as indicated in FIGS. 1, 2, 5, and 6.

The method of installing the apparatus 10 is achieved by performing the following steps: procuring a model of the apparatus 10 having a desired overall size and desirable color scheme; assembling the four (4) middle wall segments 41 of the middle wall assembly 40 together being careful to position the middle wall overlap features 43 outwardly around each corner portion formed by the middle wall panel 42 and the middle wall overlap feature 43; lowering the assembled middle wall assembly 40 into the outer container 20; engaging lower edges of each middle wall segment 41 between the pairs of corresponding wall retaining features 80 along the outer container floor 22; engaging the first finger features 46 of the first stiffeners 44 of the middle wall assembly 40 with top edges of the outer wall members 21; assembling the inner wall segments 61 of the inner wall assembly 60 together in a similar manner as the middle wall assembly 40; lowering the inner wall assembly 60 into the middle wall assembly 40; engaging lower edges of each inner wall segment 61 between the pairs of corresponding wall retaining features 80; and, engaging the second finger features 66 of the second stiffeners 64 of the inner wall assembly 60 with top edges of the middle wall segments 41.

The method of utilizing the apparatus 10 as a potted planter is achieved by performing the following steps: placing a plant 100 within the inner wall assembly 60; adding a desired volume of soil and desired potting materials into the inner wall assembly 60 and into the gaps formed between the inner wall assembly 60, the middle wall assembly 40, and the outer container 20; watering and caring for the plant 100 in a normal manner until the plant's 100 root system reaches a desire capacity within the inner wall assembly 60; removing the inner wall segments 61 upwardly using the second finger apertures 86, thereby enabling additional root system growth; continuing to care for the plant 100 for a period of time; removing the middle wall segments 41 upwardly using the first finger apertures 85 to allow the root system to expand over time to fill the outer container 20; and, benefiting from reduced or eliminated transplanting of a plant 100 as well as improved plant root system development, afforded a user of the apparatus 10.

The foregoing descriptions of specific embodiments have been presented for purposes of illustration and description. They are not intended to be exhaustive or to limit the invention and method of use to the precise forms disclosed. Various modifications and variations can be appreciated by one skilled in the art in light of the above teachings. The embodiments have been chosen and described in order to best explain the principles and practical application in accordance with the invention to enable those skilled in the art to best utilize the various embodiments with expected modifications as are suited to the particular use contemplated. It is understood that various omissions or substitutions of equivalents are contemplated as circumstance may suggest or render expedient, but is intended to cover the application or implementation without departing from the spirit or scope of the claims of the invention.

What is claimed is:

1. A partitioned planter comprising:
an outer container comprising a floor and four wall members defining an outer cavity;
a middle wall assembly removably attachable to said container floor interior to said container wall members defining a middle cavity, further comprising:
four generally "L"-shaped middle wall segments, each middle wall segment comprising a middle wall panel and a middle wall overlap feature extending perpendicularly from a longitudinal side edge of said middle wall panel;
at least one first stiffener extending perpendicularly outward from an upper edge of said each middle wall segment, each having a parallel pair of first finger features extending perpendicularly downward from an end thereof; and,
an inner wall assembly removably attachable to said container floor interior to said middle wall assembly defining an inner cavity;
wherein an upper edge of an adjacent container wall member is removably retained between said pair of first finger features;
wherein when assembled, said inner cavity, said middle cavity, and said outer cavity provide separate planting volumes of progressively larger size; and,
wherein when assembled, said middle wall overlap feature of each middle wall segment covers over a longitudinal side edge portion of a perpendicularly positioned adjacent middle wall segment.

2. The planter of claim 1, wherein said container floor further comprises a plurality of wall retaining features, each wall retaining feature comprising a pair of semi-circular protrusions defining a gap to removably retain lower edges of said middle wall assembly and said inner wall assembly therebetween.

3. The planter of claim 1, wherein said middle wall segment further comprises at least one finger aperture disposed through an upper end of said middle wall panel.

4. The planter of claim 1, wherein said inner wall assembly further comprises:
four generally "L"-shaped inner wall segments, each inner wall segment comprising an inner wall panel and an inner wall overlap feature extending perpendicularly from a longitudinal side edge of said inner wall panel;
wherein when assembled, said inner wall overlap feature of each inner wall segment covers over a longitudinal side edge portion of a perpendicularly positioned adjacent inner wall segment.

5. The planter of claim 4, wherein each of said inner wall segments further comprises at least one second stiffener extending perpendicularly outward from an upper edge for removable engagement with an upper edge of an adjacent middle wall segment.

6. The planter of claim 5, wherein each of said second stiffeners further comprises a parallel pair of second finger features extending perpendicularly downward from an end thereof;
wherein said upper edge of said adjacent middle wall segment is removably retained between said pair of second finger features.

7. The planter of claim 6, wherein said inner wall segment further comprises at least one finger aperture disposed through an upper end of said inner wall panel.

8. The planter of claim 1, wherein each of said container wall members further comprises a generally trapezoidal shape such that said container comprises a downwardly tapered profile.

9. The planter of claim 1, wherein said container floor further comprises a plurality of drain apertures.

10. The planter of claim 9, wherein said plurality of drain apertures is arranged in a generally "X"-shape extending between corners of said container floor.

11. A partitioned planter comprising:
an outer container comprising a floor and four wall members defining an outer cavity;
four generally "L"-shaped middle wall segments, each middle wall segment comprising a middle wall panel and a middle wall overlap feature extending perpendicularly from a longitudinal side edge of said middle wall panel such that when assembled said middle wall overlap feature of each middle wall segment covers over a longitudinal side edge portion of a perpendicularly positioned adjacent middle wall segment defining a middle cavity;
four generally "L"-shaped inner wall segments, each inner wall segment comprising an inner wall panel and an inner wall overlap feature extending perpendicularly from a longitudinal side edge of said inner wall panel such that when assembled said inner wall overlap feature of each inner wall segment covers over a longitudinal side edge portion of a perpendicularly positioned adjacent inner wall segment defining an inner cavity;
a plurality of wall retaining features affixed to said container floor, each wall retaining feature comprising a pair of semi-circular protrusions defining a gap to removably retain a lower edge of each of said middle wall segments and said inner wall segments therebetween; and,
a plurality of drain apertures disposed through said container floor;
wherein when assembled said inner cavity, said middle cavity, and said outer cavity provide separate planting volumes of progressively larger size.

12. The planter of claim 11, wherein each of said middle wall segments further comprises at least one first stiffener extending perpendicularly outward from an upper edge for removable engagement with an upper edge of an adjacent container wall member; and,
wherein each of said inner wall segments further comprises at least one second stiffener extending perpendicularly outward from an upper edge for removable engagement with an upper edge of an adjacent middle wall segment.

13. The planter of claim 12, wherein each of said middle wall segments further comprises at least one finger aperture disposed through an upper end of said middle wall panel; and,
wherein said inner wall segment further comprises at least one finger aperture disposed through an upper end of said inner wall panel.

14. The planter of claim 13, wherein each of said first stiffeners further comprises a parallel pair of first finger features extending perpendicularly downward from an end thereof, said upper edge of said adjacent container wall member being removably retained between said pair of first finger features; and,
wherein each of said second stiffeners further comprises a parallel pair of second finger features extending perpendicularly downward from an end thereof, said upper edge of said adjacent middle wall segment being removably retained between said pair of second finger features.

\* \* \* \* \*